US008178585B2

(12) United States Patent
Petruska et al.

(10) Patent No.: US 8,178,585 B2
(45) Date of Patent: May 15, 2012

(54) SOLVENT-FREE SYNTHESIS OF SOLUBLE NANOCRYSTALS

(75) Inventors: Melissa Petruska, Newtown, CT (US); Guiquan Pan, Danbury, CT (US)

(73) Assignee: Advanced Technology Materials, Inc., Danbury, CT (US)

( * ) Notice: Subject to any disclaimer, the term of this patent is extended or adjusted under 35 U.S.C. 154(b) by 2 days.

(21) Appl. No.: 12/743,099

(22) PCT Filed: Nov. 14, 2008

(86) PCT No.: PCT/US2008/083592
§ 371 (c)(1),
(2), (4) Date: Aug. 16, 2010

(87) PCT Pub. No.: WO2009/065010
PCT Pub. Date: May 22, 2009

(65) Prior Publication Data
US 2011/0006269 A1    Jan. 13, 2011

Related U.S. Application Data

(60) Provisional application No. 60/987,988, filed on Nov. 14, 2007.

(51) Int. Cl.
*B01J 13/00* (2006.01)
*C01B 13/14* (2006.01)

(52) U.S. Cl. .................... 516/98; 423/592.1; 423/593.1; 516/922; 977/773; 977/840; 977/900

(58) Field of Classification Search .................... 516/98, 516/922; 423/592.1, 593.1; 977/773, 840, 977/900
See application file for complete search history.

(56) References Cited

U.S. PATENT DOCUMENTS

| 6,440,213 | B1 | 8/2002 | Alicisatos et al. |
| 6,517,802 | B1 | 2/2003 | Xiao et al. |
| 6,821,337 | B2 * | 11/2004 | Bawendi et al. .................. 117/3 |
| 7,193,098 | B1 | 3/2007 | Lucey et al. |
| 7,226,953 | B1 * | 6/2007 | Petruska et al. ................ 516/98 |
| 7,235,228 | B2 | 6/2007 | Carpenter et al. |
| 7,326,365 | B2 * | 2/2008 | Bawendi et al. ....... 252/301.4 R |
| 2002/0066401 | A1 * | 6/2002 | Peng et al. ...................... 117/68 |
| 2002/0071952 | A1 | 6/2002 | Bawendi et al. |
| 2003/0165680 | A1 | 9/2003 | Brady et al. |
| 2004/0152011 | A1 | 8/2004 | Chen et al. |
| 2004/0247503 | A1 | 12/2004 | Hyeon |
| 2004/0253174 | A1 | 12/2004 | Williams |
| 2005/0063898 | A1 | 3/2005 | Ja Chisholm |
| 2006/0084278 | A1 | 4/2006 | Winter et al. |
| 2006/0133990 | A1 | 6/2006 | Hyeon et al. |
| 2007/0092423 | A1 | 4/2007 | Hyeon et al. |
| 2007/0138459 | A1 | 6/2007 | Wong et al. |
| 2007/0140951 | A1 | 6/2007 | O'Brien et al. |
| 2008/0081016 | A1 | 4/2008 | Peng et al. |

FOREIGN PATENT DOCUMENTS

| WO | 02065077 A1 | 8/2002 |
| WO | 2006052042 A1 | 5/2006 |
| WO | 2006073416 A1 | 7/2006 |

OTHER PUBLICATIONS

Jianhua Ba, et al; "Nonaqueous Synthesis of Uniform Indium Tin Oxide Nanocrystals and Their Electrical Conductivity in Dependence of the Tin Oxide Concentration," Chem. Mater., 2006, pp. 2848-2854, vol. 18.
Jelena Buha, et al; "Nonaqueous Synthesis of Nanocrystalline Indium Oxide and Zinc Oxide in the Oxygen-Free Solvent Acetonitrile," Crystal Growth & Design, 2007, pp. 113-116, vol. 7.
Hye Jin Chun et al; "Single-crystalline gallium-doped indium oxide nanowires," Applied Physics Letters, 2004, pp. 461-463, vol. 85.
Scott L. Cumberland et al; "Inorganic Clusters as Single-Source Precursors for Preparation of CdSe, ZnSe, and CdSe/ZnS Nanomaterials," Chem. Mater., 2002, pp. 1576-1584, vol. 14.
Taeghwan Hyeon et al; "Synthesis of Highly Crystalline and Monodisperse Maghemite Nanocrystallites without a Size-Selection Process," Journal of American Chemical Society, 2001, pp. 12798-12801, vol. 123.
Nikhil R. Jana et al; "Size- and Shape-Controlled Magnetic (Cr, Mn, Fe, Co, Ni) Oxide Nanocrystals via a Simple and General Approach," Chem. Mater., 2004, pp. 3931-3935, vol. 16.
Jongham Park et al; "Ultra-large-scale syntheses of monodisperse nanocrystals," Nature Materials, 2004, pp. 891-895, vol. 3.
Nicola Pinna et al; "A General Nonaqueous Route to Binary Metal Oxide Nanocrystals Involving a C—C Bond Cleavage," Journal of American Chemical Society, 2005, pp. 5608-5612, vol. 127.
Shouheng Sun et al; "Size-Controlled Synthesis of Magnetite Nanoparticles," Journal of American Chemical Society, 2002, pp. 8204-8205, vol. 124.
Shouheng Sun et al; "Monodisperse MFe2O4 (M + Fe, Co Mn) Nanoparticles," Journal of American Chemical Society, 2004, pp. 273-279, vol. 126.
X. R. Ye et al; "Room Temperature Solvent-Free Synthesis of Monodisperse Magnetite Nanocrystals," Journal of Nanoscience and Nanotechnology, 2006, pp. 852-856, vol. 6. Yadong Yin et al; "Colloidal nanocrystal synthesis and the organic-inorganic interface," Nature, 2005, pp. 664-670, vol. 437.
William W. Yu et al; "Synthesis of monodisperse iron oxide nanocrystals by thermal decomposition of iron carboxylate salts," Chem Commun., 2004, pp. 2306-2307.

* cited by examiner

*Primary Examiner* — Timothy J. Kugel
(74) *Attorney, Agent, or Firm* — Tristan A. Fuierer; Moore & Van Allen, PLLC; Rosa Yaghmour

(57) ABSTRACT

Methods for preparing high quality and high yields of nanocrystals, i.e., metal-oxide-based nanocrystals, using a novel solvent-free method. The nanocrystals advantageously comprise organic alkyl chain capping groups and are stable in air and in nonpolar solvents.

20 Claims, 7 Drawing Sheets

SOLVENT-FREE SYNTHESIS OF SOLUBLE NANOCRYSTALS

CROSS-REFERENCE TO RELATED APPLICATIONS

This application is filed under the provisions of 35 U.S.C. §371 and claims the priority of International Patent Application No. PCT/US08/83592 filed on 14 Nov. 2008 and entitled "Solvent-Free Synthesis of Soluble Nanocrystals" which claims priority to U.S. Provisional Patent Application No. 60/987,988 filed on 14 Nov. 2007, both of which are hereby incorporated herein by reference in their entireties.

FIELD

This invention generally relates to a new and improved method for the synthesis of soluble nanocrystals. More specifically, it relates to soluble metal oxide nanocrystals synthesized in a solvent-free or substantially solvent-free environment.

DESCRIPTION OF THE RELATED ART

There is a great deal of interest in manufacturing particulate materials in a controlled fashion with particle sizes less than about 1000 nm, e.g., particles having diameters in a range from about 1 nm to about 100 nm, commonly referred to as nanoparticles or nanocrystals. For example, nanocrystals of metal oxides have known application as additives for polymeric material as a means to increase the material's overall refractive index. Such additives are useful for the preparation of optical articles that transmit or reflect light. Articles that benefit from the addition of high refractive index additives include optical lenses, light management films, Fresnel lenses, antireflective coatings, optical disks, diffuser films, holographic substrates, and the like.

Nanocrystals are also useful in a variety of applications, including catalysis, electrocatalysis, absorbance, chemical separations and bio-separation applications, because of the greater surface area and surface energy, as well as in the formulation of inks, pastes and tapes that are used in depositing thin or thick films, such as optically transparent conductors for use in displays, magnetic coatings for storage media and printed circuitry for electronic applications Inks and pastes with nanocrystals have improved rheology characteristics (e.g., flowability), that allow thinner layers to be applied and allow deposition of features with smaller dimensions. In addition to the examples above, nanocrystals are being used, or considered for use, in many other applications including pharmaceutical formulations, drug delivery applications, medical diagnostic aids, sensors, abrasives, pigments, phosphors for lighting, displays, security applications, dental glasses, polymeric fillers, thermal interface materials and cosmetics.

In the region where the effects of quantum confinement dominate, colloidal nanocrystals have size-tunable optical, electronic, and magnetic properties that are not available in the corresponding bulk materials. Specifically for semiconductor nanocrystals, the bandgap shifts to higher energy when the size of the particle is smaller than its exciton Bohr radius. Accordingly, semiconductor nanocrystals—often called quantum dots—have been used for many applications including, but not limited to, optical communications, light-emitting diodes, lasers, photonic chips, photovoltaic devices, photoelectric devices, catalysts, biolabels for bioimaging, sensors, batteries, fuel cells, and the like.

Presently, nanocrystals are synthesized using a number of different methods including co-precipitation in an aqueous solution, using reverse micelles as templates, thermal synthesis in the presence of a solvent, surfactant-controlled growth in a hot organic solvent, physical and/or aerosol methods, and the sol-gel process. Disadvantageously, the conventional syntheses of soluble colloidal nanocrystals typically use a large amount of solvents and/or capping ligands (see, e.g., Yin, Y., Alivisatos, P., Nature, 437, 664-670 (2005)), which can be expensive, toxic, and difficult to re-use or recover after the reaction. Moreover, most of the known methods are laborious, require complex equipment and a high level of technology and/or numerous successive steps, including thermal treatment steps and separating steps (washing, purification, etc.), and produce large quantities of polluting by-products or waste (especially solvents). As such, scale-up of nanocrystal syntheses have been costly and often produce a large amount of waste.

A synthetic process to obtain nanocrystals, e.g., metal oxide nanocrystals, that are soluble in nonpolar environments through an inexpensive process is described herein in order to overcome the aforementioned deficiencies of the prior art. Specifically, a solvent-free or substantially solvent-free process of synthesizing colloidal metal oxide nanocrystals that are soluble in nonpolar environments is described. The process is scalable to mass produce colloidal nanocrystals and provides for high yields of the nanocrystalline products.

SUMMARY

The present invention relates generally to new and improved methods for preparing high quality, soluble nanocrystals, i.e., metal-oxide-based nanocrystals, using a novel solvent-free method. The nanocrystals advantageously comprise organic alkyl chain capping groups and are stable in air and in nonpolar solvents.

In one aspect, a new and improved method of synthesizing soluble colloidal nanocrystals is described, said method comprising heating a reaction mixture comprising at least one single source metal-ligand complex, a metal-ligand mixture, or combinations thereof, in a solvent-free environment at temperature and time effective to thermally decompose the reaction mixture into material comprising colloidal nanocrystals. The colloidal nanocrystals are soluble in nonpolar organic solvents.

In another aspect, a new and improved method of synthesizing soluble colloidal nanocrystals comprising at least one metal oxide is described, said method comprising:
  reacting at least one metal salt and at least one long chain surfactant in a solvent-free or substantially solvent-free environment at temperature and time effective to produce a metal-ligand mixture; and
  heating the metal-ligand mixture, optionally in the presence of an activating agent, in a solvent-free or substantially solvent-free environment at temperature and time effective to thermally decompose the metal-ligand mixture into material comprising colloidal nanocrystals.

In still another aspect, magnesium oxide nanocrystals are described, said nanocrystals comprising substantially crystalline MgO, wherein the nanocrystals are soluble in a nonpolar solvent. The 2θ values for the substantially crystalline MgO are 36.8±0.5°, 42.8±0.5°, 62.2±0.5°, 74.5±0.5°, and 78.4±0.5°.

Yet another aspect to gallium indium oxide nanocrystals comprising substantially crystalline $Ga_xIn_{2-x}O_3$ (x=0-2), wherein the nanocrystals are soluble in a nonpolar solvent.

Still another aspect relates to the use of metal oxide nanocrystals formed by the method described herein as transparent conducting oxides for printable electronics and for other applications including reversible contrast enhancement layers, batteries, or fuel cells.

Other aspects, features and advantages will be more fully apparent from the ensuing disclosure and appended claims.

DETAILED DESCRIPTION, AND PREFERRED EMBODIMENTS THEREOF

Figure 1:
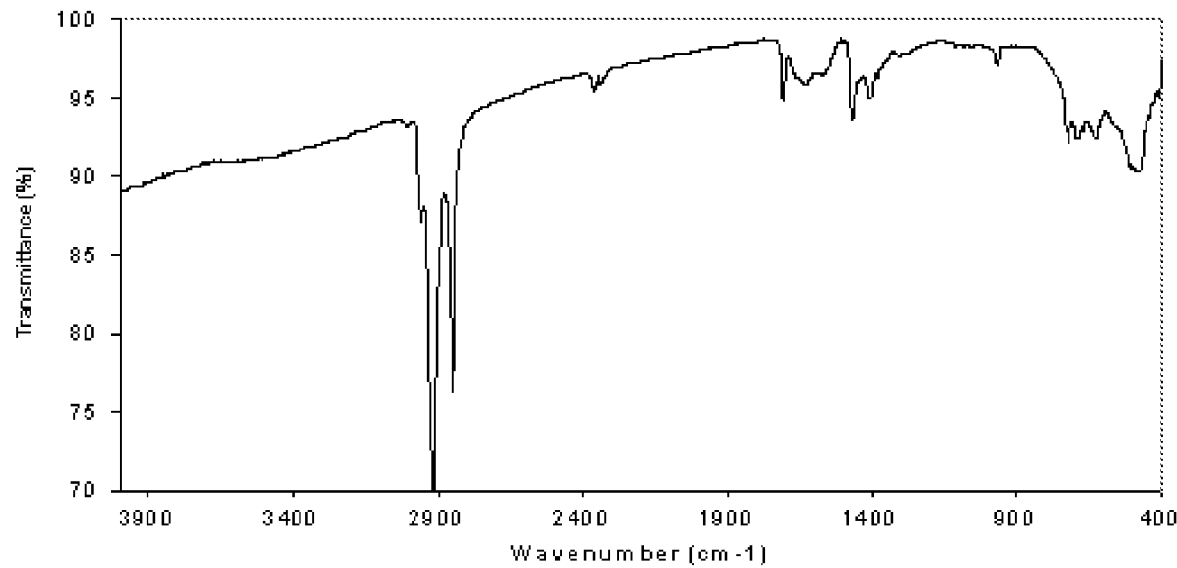
FIG. 1 is an FTIR spectrum of gallium oxide ($Ga_2O_3$) nanocrystals synthesized using the method described herein.

The present invention relates generally to methods of preparing soluble nanocrystals using a new solvent-free synthetic route. The synthesized nanocrystals, specifically metal oxide-based nanocrystals, are soluble in nonpolar solvents due to the presence of one or more nonpolar capping groups at the surface of the metal oxide.

Colloidal nanocrystals are known in the art as having inorganic cores stabilized by at least a partial layer of capping ligands, e.g., surfactants or specific pendant group(s), on the surface. It is widely accepted that the organic capping ligands, e.g., surfactants, are an essential part of determining the size and shape of the nanocrystals, for providing particle solubility and for limiting agglomeration of the particles. Id. Moreover, the composition and crystal structure of colloidal nanocrystals are readily tunable by altering the chemical and physical conditions of the synthesis reaction. This tunability makes colloidal nanocrystals promising for a whole host of material, device, and biological applications.

As understood by the skilled practitioner, the term "nanocrystal" refers specifically to a nanoparticle comprising an inorganic core of nanometer dimensions, e.g., about 1 nm to about 100 nm. The nanocrystals may be semiconductors, conductors, or dielectrics or they can exhibit other properties of interest, including magnetic and catalytic behavior. The present invention encompasses nanoparticles having crystalline, semi-crystalline, poly-crystalline, and non-crystalline, i.e., amorphous, metal oxide inorganic cores. The methods described herein are particularly advantageous for producing nanoparticle products that are crystalline. In addition, it should be appreciated that the term nanocrystals may be used to describe an aggregate or a non-aggregate of inorganic cores of nanometer dimensions. It is to be appreciated that the terms nanocrystals, nanoparticles, nanodots, nanoflowers, nanomaterials, nanospheres, nanobeads, microcrystallites, nanoclusters, quantum dots, quantum spheres, quantum crystallite, microcrystal, colloidal particle, Q-particle, and nanocubes are to be considered interchangeable.

As well established in the art, a "solute" dissolves in a "solvent" to form a "solution." "Solvent" corresponds to any substance that the metal salt dissolves in to form a metal salt solution, the ligand dissolves in to form a ligand solution, the metal-ligand mixture dissolves in to form a metal-ligand solution, or that the single-source metal-ligand complex dissolves in to form a single-source metal-ligand complex solution, wherein the solvent and solution are in the liquid phase. As further defined herein, a solvent is a component present in excess amounts and is passive. In other words, components that are added in specific molar amounts or equivalents for chemical participation with other components are not considered solvents herein. Solvents include water, non-polar solvents, polar solvents, surfactants (in excess), and combinations thereof "Solvent-free" corresponds to the metal salt and the ligand, the metal-ligand mixture, or the single-source metal-ligand complex in the absence of solvent. "Substantially solvent-free" corresponds to the metal salt and the ligand, the metal-ligand mixture, or the single-source metal-ligand complex including less than about 2 wt. % solvent, more preferably less than 1 wt. %, even more preferably less than 0.5 wt. % and most preferably less than 0.1 wt. % solvent, based on the total weight of the reaction mixture.

As defined herein, "soluble" corresponds to the dissolution, in a solvent, of at least a percentage of the colloidal nanocrystals prepared according to the methods described herein, for example, at least about 50% of the colloidal nanocrystals prepared, preferably at least about 70% of the colloidal nanocrystals prepared, more preferably at least about 90% of the colloidal nanocrystals prepared, and most preferably, at least about 95% of the colloidal nanocrystals prepared as described herein are soluble in a solvent. Although not wishing to be bound by theory, the extent of solubility is thought to be dependent on the amount of ligands attached to the surface of the colloidal nanocrystals.

As defined herein, "substantial absence" of a species corresponds to the presence of less than 5 wt. %, preferably less than 2 wt. %, more preferably less than 1 wt. %, and most preferably less than 0.1 wt. %, of the specified compounds in the reaction mixture, based on the total weight of the reaction mixture.

As defined herein, "reaction mixture" refers to the reactants, e.g., the single source metal-ligand complex, metal-ligand mixture, metal-ligand complex in the presence of at least one activating agent, or metal-ligand mixture in the presence of at least one activating agent, that are converted to colloidal nanocrystals using the methods described herein.

As defined herein, the "metal-ligand mixture" corresponds to a solid, liquid, or gelatinous mixture formed in situ when at least one metal salt and at least one ligand are combined in a more than stoichiometric, a stoichiometric or less than stoichiometric ratio, preferably a stoichiometric or less than stoichiometric ratio. It should be appreciated that the metal-ligand complex consists of the metal and the ligand in a stoichiometric ratio, a metal-ligand complex consisting of the metal and the ligand in a less than stoichiometric ratio, a metal salt and/or ligand, or combinations thereof. The "single-source metal-ligand complex" corresponds to a solid or liquid metal-ligand complex purchased commercially or synthesized, separated, and dried, wherein the single-source metal-ligand complex consists of the metal and the ligand in a stoichiometric or less than stoichiometric ratio.

As defined herein, "less than stoichiometric ratio" corresponds to having less ligand available than is necessary for complete stoichiometry with the metal.

As defined herein, "gelatinous" corresponds to a material that is a semi-solid colloidal gel that may be oligomeric or polymeric in nature.

It is to be appreciated that although reference is repeatedly made to "metal oxide" nanocrystals, preferably MgO, ZnO, $In_2O_3$, MnO, $MnO_2$, $Ga_2O_3$, and $Al_2O_3$, the process of the reaction may be readily used to prepare mixed metal oxides, metal sulfides, metal selenides, metal tellurides, metal nitrides, metal phosphides, metal arsenides, and alloys thereof.

As defined herein, a "mixed metal oxide" or "alloyed metal oxide" corresponds to a nanocrystal having at least two different metals in the inorganic oxide core.

As defined herein, "substantially crystalline" corresponds to material that has a definite ordered array of atoms, ions, or molecules, and whose X-ray diffraction pattern contains Bragg reflections that can be indexed as the corresponding crystalline material.

The present inventors demonstrate herein that soluble metal oxide nanocrystals may be synthesized without using any solvent. For example, a "reaction mixture" including a single source metal-ligand complex containing long-chain surfactants and at least one metal ion may be processed according to the method described herein. Alternatively, a "reaction mixture" including a metal-ligand mixture containing long-chain surfactants and at least one metal ion (salt) may be processed according to the method described herein. In both cases, the surfactants or chemical pendant group(s) act as capping ligands once the at least one metal compound decomposes to the metal oxide nanoparticle. As introduced hereinabove, the capping ligands control the size and the shape of the growing nanocrystal core and allow for nanocrystal solubility in a variety of nonpolar solvents. These solvent-free or substantially solvent-free reactions are often complete in less than 1 or 2 hours.

There are a number of significant advantages of the method introduced herein relative to the processes known in the art including, but not limited to: a simpler, cost-effective, green process that eliminates the need for solvents and excess ligands that do not participate in the reaction process; the use of a significantly smaller amount of reagents, resulting in easier purification of the nanocrystals; the flexibility to use a wide variety of commercially available metal precursors; less equipment and therefore a smaller footprint; and the scalability of the process for the production of large quantities of nanocrystals.

In one aspect, a method of synthesizing soluble colloidal nanocrystals comprising at least one metal oxide is described, said method comprising heating at least one single source metal-ligand complex in a solvent-free or substantially solvent-free environment at temperature and time effective to thermally decompose the single source metal-ligand complex into material comprising colloidal nanocrystals. The "material comprising colloidal nanocrystals" is not considered a solution.

In one embodiment, at least one activating agent is combined with the at least one single source metal-ligand complex in the solvent-free or substantially solvent-free environment at temperature and time effective to thermally decompose the single source metal-ligand complex into material comprising colloidal nanocrystals. The at least one activating agent is added in specific molar amounts or equivalents for chemical participation with the at least one single source metal-ligand complex and as such, are not considered solvents. The "material comprising colloidal nanocrystals" is not considered a solution.

Preferred conditions of this aspect include heating in a gaseous environment, for example, in the presence of $N_2$, Ne, Ar, Kr, or Xe, and/or in air, $N_2O$ or $O_2$. The temperature of the reaction is preferably in a range from about 30° C. to about 350° C., more preferably about 240° C. to about 320° C. The temperature of the reaction must be at or below the boiling point of the neat ligand associated with the metal-ligand complex. The time of the reaction is preferably in a range from about 10 seconds to about 240 min, more preferably about 10 min to about 180 min. The pressure is preferably ambient, although super-ambient or sub-ambient pressures may be used. The temperature of the reaction may be rapidly ramped to the reaction temperature, or alternatively, the temperature may be increased incrementally with time (e.g., 10° C./min) until the reaction temperature is reached and thereafter, the temperature may be maintained at the reaction temperature until the colloidal nanocrystals are formed.

Following the formation of the colloidal nanocrystals, the material may be cooled, e.g., to less than 100° C., preferably to room temperature, followed by extraction of the colloidal nanocrystals from the material into at least one nonpolar solvent. Because of the organic capping ligands, the colloidal nanocrystals synthesized according to the methods described herein are readily soluble in a nonpolar solvent. Examples of nonpolar solvents include, but are not limited to, pentane, hexane, heptane, octane, toluene, and dodecane. A polar organic solvent may be added to the nonpolar solvent solution containing the solubilized colloidal nanocrystals to precipitate the nanocrystals, which can then be isolated and collected using centrifugation. Examples of polar organic solvents contemplated include straight-chained and branched $C_1$-$C_5$ alcohols (e.g., methanol, ethanol, propanol, butanol and pentanol), ethyl acetate, and acetone. The nonpolar and polar solvents may be added in series one or multiple times using the same or different solvents. For example, the colloidal nanocrystals may be extracted with nonpolar hexane, precipitated with butanol, redissolved with hexane and precipitated with methanol. The number of times the nanocrystals are extracted and precipitated and the solvents used is readily determinable by one skilled in the art and the combination of nonpolar and polar solvents is not limited to the example provided herein. To isolate the nanocrystals, formed in the solvent-free or substantially solvent-free synthesis, small amounts of both nonpolar and polar solvents are added. Notably, the quantity of solvents used for isolation and purification of the colloidal nanocrystals is substantially smaller than that required for the nanocrystal syntheses of the prior art methods that require solvent to produce the nanocrystals. Alternatively, the nanocrystals can be isolated by dissolution in a solvent that does not dissolve the reaction by-products, requiring the use of an even smaller amount of solvent. In contrast, the reaction by-products may be preferentially removed from the reaction mixture by selecting a solvent that dissolves the by-products but not the nanocrystals.

Non-limiting examples of the metal in the metal precursor and hence the metal oxide nanocrystal are alkali metals such as Li, Na, K, Rb, or Cs; alkaline earths such as Mg, Ca, Sr, or Ba; transition metals of groups 3 through 12 such as Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, or Cd; rare earths such as Ce, Pr, Nd, Dy, Th, Eu, Gd, Er, or La; metalloids such as B, Al, Ga, In, Ge, Sn, Sb, Bi, or Pb; and the like.

The single-source metal-ligand complex includes at least one long chain surfactant with a polar head group and a non-polar tail having at least six carbon atoms. In general, surfactants may be either nonionic, anionic, cationic, zwitterionic or combinations thereof. The surfactant may or may not form an ionic, covalent, or dative bond with the metal complex. The surfactant may or may not form a micellar structure before, during, or after the reaction to form the oxide nanoparticles. Typically, the surfactant comprises a non-polar tail group containing 6-25 carbon atoms, with or without side chain substituents, and a polar head group which interacts with the metal precursor, the nanocrystal surface, or both. Examples of head groups include sulfate (($-O_2SO_2$), sulfonate ($-SO_2OH$), sulfinate ($-SOOH$), phosphate (($-O)_3PO$), phosphite (($-O)_3P$), phosphine ($-P$), phosphine oxide ($-PO$), phosphinate ($-POOH$), phosphonate ($-PO(OH)_2$), carboxylate ($-COOH$), alcohol ($-OH$), thiol ($-SH$), and amine ($-NH_2$). The surfactants can coordinate to the metal precursor or nanocrystal surface through a single head group, or they can be multidentate, binding through multiple head groups. Examples of the latter include diols, triols, dithiols, diamines, triamines, diacids, and the like. Multidentate ligands can also take the form of oligomeric or polymeric surfactants.

Typically, non-ionic surfactants useful herein are carboxylic acids of the formula RCOOH such as oleic acid, stearic acid, myristic acid, linoleic acid, lauric acid, 2-ethylhexanoic acid, azelaic acid, palmitic acid, linolenic acid, erucic acid and the like; amines such as stearyl amine, oleyl amine, erucic amine, lauryl amine and the like; alcohols such as decanol, cetyl alcohol, oleyl alcohol, stearyl alcohol, lauryl alcohol and the like; thiols such as decanethiol, dodecanethiol, tetradecanethiol, hexadecanethiol, and the like; phosphines such as trioctylphosphine, tris(2-ethylhexyl)phosphine, triphenylphosphine, tri-p-tolylphosphine, tri-m-tolylphosphine, tri-o-tolylphosphine, methyldiphenylphosphine, ethyldiphenylphosphine; cyclohexyldiphenylphosphine; benzyldiphenylphosphine, and the like; phosphine oxides such as trioctylphosphine oxide, tris(2-ethylhexyl)phosphine oxide, triheptyl phosphine oxide, tripentyl phosphine oxide, tridecyl phosphine oxide and the like; phosphites such as tris(2-ethylhexyl)phosphite, trioleyl phosphite, trilauryl phosphite, tristeryl phosphite, di isodecyl pentaerythytol diphosphite, trioctyl phosphite, triphenyl phosphite, tricyclodecane dimethanol phosphite and the like; phosphates such as tris(2-ethylhexyl)phosphate, trioleyl phosphate, tristearyl phosphate, trilauryl phosphate, tributyl phosphate, trioctyl phosphate and the like; phosphonic acids such as octadecylphosphonic acid, tetradecylphosphonic acid, pentadecylphosphonic acid, dodecylphosphonic acid, decylphosphonic acid, and the like; sulfoxides such as decyl methyl sulfoxide, dimethyl sulfoxide, dioleyl sulfoxide, dilauryl sulfoxide, distearyl sulfoxide and the like; sulfones such as tosyloxyphenyl sulfone, tosyloxyvinyl sulfone and the like.

Examples of ionic surfactants include compounds where the polar group is an ionic group or a salt, including sulfonates such as sodium dodecyl sulfate, sodium lauryl sulfate, sodium benzene sulfonate, sodium tolylsulfonate and the like; ammonium salts such as tetrabutyl ammonium hydroxide, tetraethyl ammonium hydroxide, cetyl trimethyl ammonium bromide, tetraphenyl ammonium hydroxide and the like; thiolates with counterions such as lithium, sodium, potassium, calcium, magnesium, and the like; carboxylates of the carboxylic acids enumerated above; and phosphonates of the phosphonic acids enumerated above.

The single-source metal-ligand complex may be commercially purchased or may be synthesized, isolated, and dried. Synthesizing the single source metal-ligand complex has the advantage of allowing the user to vary the ratio of metal ion to ligand, which allows the user to tune the particle size of the produced metal oxide nanocrystal. Regardless of the method of obtaining the single source metal-ligand complex, the single source precursor consists of the metal and the ligand in a stoichiometric or less than stoichiometric ratio.

Activating agents contemplated include alcohols, diols, amines, diamines, carboxylic acids, diacids, acid chlorides, carboxylate salts, anhydrides, and oligomeric and polymeric structures with multiple reactive sites. Examples include $C_6$-$C_{22}$ alcohols having the formula $CH_3(CH_2)_nOH$ or $CH_3(CH_2)_mCH(OH)CH_3$, wherein n is an integer in a range from 5 to 21 and m is an integer in a range from 3 to 19. For example, the alcohols may be 1-tetradecanol, 2-tetradecanol, 1-pentadecanol, 1-hexadecanol, 2-hexadecanol, 1-heptadecanol, 1-octadecanol, 1-nonadecanol, 1-eicosanol, 1-docosanol, or combinations thereof Diols contemplated include compounds having the formula R—$CH_2CH(OH)CH_2OH$, where R=$C_5$-$C_{19}$ alkyl group. For example, the long-chain diol may be 1,2-dodecanediol. Long-chain amines include $C_6$-$C_{22}$ primary amines such as tetradecylamine, pentadecylamine, hexadecylamine, heptadecylamine, octadecylamine, nonadecylamine, eicosanylamine, and docosanylamine. Examples of oligomeric and polymeric activating agents include poly(vinyl alcohol), polyacrylic acid, polymethacrylic acid, and modifications of same (e.g., with alkyl chains). In yet another alternative, the activating agent may be a catalyst. Although not wishing to be bound by theory, the activating agents are thought to change the chemical mechanism by which the metal oxide particles grow by facilitating the decomposition of the metal-ligand precursor. In some cases, they are also expected to bind to some extent on the surface of the nanocrystals. As such, the activating agents are not passive components in the process. Accordingly, the activating agents, for the purposes of the methods described herein, are not solvents.

The particle size and/or shape can be tuned in a substantially solvent-free environment with reaction temperature, reaction time, the identity and/or the amount of the ligand. For those reactions that include an activating agent, particle size and/or shape can also be tuned by changing the identity and the amount of activating agent included in the reaction. In some embodiments, the extent of aggregation of the nanocrystals and the shape of the nanostructures can be tuned by varying these same conditions.

In another aspect, another method of synthesizing soluble colloidal nanocrystals comprising at least one metal oxide is described, said method comprising heating a metal-ligand mixture in a solvent-free or substantially solvent-free environment at temperature and time effective to thermally decompose the metal-ligand mixture into material comprising colloidal nanocrystals. The "material comprising colloidal nanocrystals" is not considered a solution.

In one embodiment, at least one activating agent is combined with the metal-ligand mixture in the solvent-free or substantially solvent-free environment at temperature and time effective to thermally decompose the metal-ligand mixture into material comprising colloidal nanocrystals. The at least one activating agent is added in specific molar amounts or equivalents for chemical participation with the at least one single source metal-ligand complex and as such, are not considered solvents. The "material comprising colloidal nanocrystals" is not considered a solution.

Preferred conditions include heating in a gaseous environment, for example, in the presence of $N_2$, Ne, Ar, Kr, or Xe, and/or in air, $N_2O$ or $O_2$. The temperature of the reaction is preferably in a range from about 30° C. to about 350° C., more preferably about 240° C. to about 320° C. The temperature of the reaction must be at or below the boiling point of the neat ligand associated with the metal-ligand complex. The time of the reaction is preferably in a range from about 10 seconds to about 240 min, more preferably about 10 min to about 180 min. The pressure is preferably ambient although super-ambient or sub-ambient pressures may be used. The temperature of the reaction may be rapidly ramped to the reaction temperature, or alternatively, the temperature may be increased incrementally with time (e.g., 10° C./min) until the reaction temperature is reached and thereafter, the temperature may be maintained at the reaction temperature until the colloidal nanocrystals are formed.

Following the formation of the colloidal nanocrystals, the material may be cooled, e.g., to less than 100° C., preferably to room temperature, followed by extraction of the colloidal nanocrystals from the material into at least one non-polar solvent. Because of the organic capping ligands, the colloidal nanocrystals synthesized according to the methods described herein are readily soluble in a nonpolar solvent. Examples of nonpolar solvents include, but are not limited to, pentane, hexane, heptane, octane, toluene, and dodecane. A polar organic solvent may be added to the nonpolar solvent solution containing the solubilized colloidal nanocrystals to precipitate the nanocrystals, which can then be collected using centrifugation. Examples of polar organic solvents contemplated include straight-chained and branched $C_1$-$C_5$ alcohols (e.g., methanol, ethanol, propanol, butanol and pentanol), ethyl acetate, and acetone. The nonpolar and polar solvents may be added in series one or multiple times using the same or different solvents. For example, the colloidal nanocrystals may be extracted with nonpolar hexane, precipitated with butanol, redissolved with hexane and precipitated with methanol. The number of times the nanocrystals are extracted and precipitated and the solvents used is readily determinable by one skilled in the art and the combination of nonpolar and polar solvents is not limited to the example provided herein. To isolate the nanocrystals formed in the solvent-free or substantially solvent-free synthesis, small amounts of both polar and nonpolar solvents are needed, albeit in substantially smaller quantities than that required for the nanocrystal syntheses of the prior art that require solvent to produce the nanocrystals. Alternatively, the nanocrystals can be isolated by dissolution in a solvent that does not dissolve the reaction by-products, requiring the use of an even smaller amount of solvent used. In contrast, the reaction by-products may be preferentially removed from the reaction mixture by selecting a solvent that dissolves the by-products but not the nanocrystals.

The metal-ligand mixture may be produced by combining at least one metal salt and at least one long chain surfactant in a solvent-free or substantially solvent-free environment at temperature and time effective to produce the metal-ligand mixture. The surfactants are as previously described. The metal salts include an anionic group selected from the group consisting of formate, acetate, acetylacetonate, fluoride, oxide, alkoxide, chloride, bromide, iodide, carbonate, hydroxide, oxalate, sulfate, sulfite, phosphate, phosphate, and nitrate, and the metals previously disclosed. The metal salt may be hydrated or anhydrous. The at least one metal salt and the at least one long chain surfactant may be combined in a container and heated to temperature in a range from about 50° C. to about 200° C. for time in a range from about 10 min to about 120 min. During heating, a stream of gas, e.g., $N_2$, Ne, Ar, Kr, or Xe, may be injected into the metal salt-surfactant mixture to drive off any water present or alternatively, water present may be removed in vacuo. The reactants of the metal-ligand mixture comprise at least one metal salt and at least one ligand in a stoichiometric or less than stoichiometric ratio, whereby the product of the at least one metal salt and the at least one ligand includes the metal-ligand mixture. The product is a solid, liquid or gelatinous metal-ligand mixture that may subsequently be heated in a solvent-free or substantially solvent-free environment at temperature and time effective to thermally decompose the metal-ligand mixture into material comprising colloidal nanocrystals, as described herein. Alternatively, the solid, liquid or gelatinous metal-ligand mixture may be combined with at least one activating agent and the mixture may subsequently be heated in a solvent-free or substantially solvent-free environment at temperature and time effective to thermally decompose the metal-ligand mixture into material comprising colloidal nanocrystals, as described herein. When preparing the metal-ligand mixture, no solvents are used, as evidenced by the fact that the metal and the ligand are mixed in a stoichiometric or less than stoichiometric ratio. Similarly, when decomposing the metal-ligand mixture, whether activating agent is present or not, no solvents are used.

In yet another aspect, at least one activating agent is combined with the at least one metal salt and at least one long chain surfactant in a solvent-free or substantially solvent-free environment at temperature and time effective to thermally decompose the mixture into material comprising colloidal nanocrystals.

In still another aspect, at least one carboxylic acid is combined with at least one metal oxide component in a solvent-free or substantially solvent-free environment at temperature and time effective to thermally decompose the mixture into material comprising colloidal nanocrystals, wherein the at least one carboxylic acid acts as the activating agent and wherein the at least one carboxylic acid and the at least one metal oxide are mixed in a stoichiometric or less than stoichiometric ratio.

As mentioned, using a metal-ligand mixture has the advantage of allowing the user to vary the ratio of metal ion to ligand, which can allow the user to tune the particle size of the produced metal oxide nanocrystal. For example, as the ratio of ligand to metal ion decreases, the size of the nanocrystal particles decreases. Preferably the ratio of metal ion to ligand is stoichiometric or less than stoichiometric. Furthermore, the particle size and/or shape can be tuned in a substantially solvent-free environment with reaction temperature, reaction time, the identity and/or the amount of the ligand. For those reactions that include an activating agent, particle size and/or shape can be tuned by changing the identity and the amount of activating agent included in the reaction. In some embodiments, the extent of aggregation of the nanocrystals and the shape of the nanostructures can be tuned by varying these same conditions.

An advantage of the methods described herein is that the resulting metal oxide nanocrystals are coated with at least a partial layer of organic material, e.g., surfactant or other pendant group(s), also referred to as a capping ligand. The organic coating is beneficial for their subsequent uses in a variety of applications, such as, for example, pharmaceutical compositions, cosmetics, films and the like. In addition, the method affords excellent mass yields of nanocrystals, comparable to or higher than yields for materials prepared according to the traditional methods where solvents are used during colloidal nanocrystal synthesis. Further, less solvent is required because solvent is only used during isolation and purification, which has the advantage of lower costs and less waste that must be disposed of properly, and reaction times for preparing the colloidal nanocrystals can be shorter than for nanocrystals prepared according to traditional methods.

The methods described herein may be used to prepare metal oxides from a variety of monovalent, divalent, trivalent, and tetravalent metals, as well as mixed metal oxides. For example, the reaction mixture may include at least two single source metal-ligand complexes, wherein at least two different metals are present. Alternatively, the reaction mixture may include at least one single source metal-ligand complex and a metal-ligand mixture including at least one metal, wherein the combination of the single source metal-ligand complex and the metal-ligand mixture includes at least two different metals. In yet another alternative, the reaction mixture may include a metal-ligand mixture, wherein at least two different metals are present. The at least one activating agent may be present in any of the aforementioned reaction mixtures. Mixed metal oxides contemplated include, but are not limited to, indium tin oxide, gallium indium oxide, aluminum gallium oxide, indium aluminum oxide, zinc aluminum oxide, zinc gallium oxide, zinc indium oxide, and magnesium zinc oxide. The method of heating the at least one single-source metal ligand complex or the metal-ligand mixture is performed in the substantial absence of sodium salts, polysorbate 80, reducing agents, hydroxide bases, and hydrocarbon solvents such as 1-octadecene.

The colloidal nanocrystals described herein may be monodisperse or polydisperse, aggregated or non-aggregated. The diameter of the colloidal nanocrystals is preferably in a range from about 1 to about 30 nm. The nanocrystals may be spherical, polygonal, cubed, rod-shaped, tube-shaped, or disc-shaped, aggregated or non-aggregated, and symmetrical or asymmetrical. Preferably, the nanocrystals are spherical or substantially spherical. In addition, the nanocrystals are substantially uniform in crystal structure.

Similar to colloidal nanocrystals in the art, the ligands on the colloidal nanocrystals are exchangeable. Ligand exchange procedures are known in the art to modify the chemical characteristics of the nanoparticle in order to make it compatible with a particular solvent or matrix. For example, the ligands used during the synthesis of nanocrystals may be exchanged for ligands that allow for crosslinking via multi-functional ligands having a plurality of metal chelating groups. The multifunctional ligand may be selected such that it has more than one functional group that allows for the attachment with more than one nanocrystal. Multifunctional ligands include polyamines and polythiols. Alternatively, water solubility of the nanocrystal may be effectuated by ligand exchange (i.e., by replacing hydrophobic end groups with ligands having hydrophilic end groups such as carboxylic acids or amine groups).

In another aspect, a method of synthesizing colloidal nanocrystals comprising at least one metal oxide is described, said method comprising:

reacting at least one metal salt and at least one long chain surfactant in a solvent-free or substantially solvent-free environment at temperature and time effective to produce a metal-ligand mixture; and heating the metal-ligand mixture, optionally in the presence of an activating agent, in a solvent-free or substantially solvent-free environment at temperature and time effective to thermally decompose the metal-ligand mixture into material comprising colloidal nanocrystals.

The reaction of the at least one metal salt and the at least one long chain surfactant was previously described, wherein a stream of gas may be injected into the metal salt-surfactant mixture to drive off any water present. The colloidal nanocrystals may subsequently be isolated as previously described.

In yet another aspect, magnesium oxide colloidal nanocrystals that are soluble in nonpolar solvents are described. The MgO nanocrystals are substantially crystalline, having 2θ values of 36.8±0.5°, 42.8±0.5°, 62.2±0.5°, 74.5±0.5°, and 78.4±0.5°, and are capped with surfactants.

In yet another aspect, indium gallium oxide colloidal nanocrystals that are soluble in nonpolar solvents are described. The GaInO$_3$ nanocrystals are substantially crystalline, having 2θ values corresponding to powder diffraction file (PDF) number 21-0333 (29.6°, 31.1°, 32.0°, 34.6°, 38.5°, 43.5°, 49.3°, 55.4°, 55.8°, 57.7°, 61.5°, 62.9°, 64.1°, 65.0°, 65.4°, 67.0°) and are capped with surfactants.

In still another aspect, the synthesis of MgO colloidal nanocrystals is described, said process comprising heating at least one single source metal-ligand complex, optionally in the presence of an activating agent, in a solvent-free or substantially solvent-free environment at temperature and time effective to thermally decompose the single source metal-ligand complex into material comprising the MgO colloidal nanocrystals.

In another aspect, the synthesis of Ga$_x$In$_{2-x}$O$_3$ (x=0-2) colloidal nanocrystals is described, said process comprising heating at least two single source metal-ligand complexes, e.g., indium oleate and gallium oleate, optionally in the presence of an activating agent, in a solvent-free or substantially solvent-free environment at temperature and time effective to thermally decompose the at least two single source metal-ligand complexes into material comprising the Ga$_x$In$_{2-x}$O$_3$ (x=0-2) colloidal nanocrystals. In still another aspect, to the synthesis of Ga$_x$In$_{2-x}$O$_3$ (x=0-2) colloidal nanocrystals is described, said process comprising heating a single source metal-ligand complex including both indium and gallium in said complex, optionally in the presence of an activating agent, in a solvent-free or substantially solvent-free environment at temperature and time effective to thermally decompose the single source metal-ligand complex into material comprising the Ga$_x$In$_{2-x}$O$_3$ (x=0-2) colloidal nanocrystals.

Another aspect relates to MgO colloidal nanocrystals synthesized by heating a metal-ligand mixture, optionally in the presence of an activating agent, in a solvent-free or substantially solvent-free environment at temperature and time effective to thermally decompose the metal-ligand mixture into material comprising MgO colloidal nanocrystals.

Still another aspect relates to Ga$_x$In$_{2-x}$O$_3$ (x=0-2) colloidal nanocrystals synthesized by heating a metal-ligand mixture including indium and gallium metal salts, optionally in the presence of an activating agent, in a solvent-free or substantially solvent-free environment at temperature and time effective to thermally decompose the metal-ligand mixture into material comprising Ga$_x$In$_{2-x}$O$_3$ (x=0-2) colloidal nanocrystals.

Still another aspect relates to the incorporation of the colloidal nanocrystals described herein into a film, an optical fiber, an organic, inorganic, or hybrid polymer, a composite, or an organic solvent. Because of the solubility of the colloidal nanocrystals, they can be easily manipulated, mechanically or chemically, into larger structures such as films, composites, etc.

Yet another aspect relates to the use of the nanocrystals described herein as reversible photo-bleachable materials.

It is well known that a material is opaque to light of certain wavelengths because said material absorbs photons of that particular wavelength. The absorption sometimes induces the degradation or saturation of the light absorption mechanism which renders the material transparent to said wavelength. This process is called photo-bleaching. For many materials, photo-bleaching is not reversible, e.g., polymeric photoresists are degraded or cross-linked. However, for many applications, reversible photo-bleaching is highly desirable, i.e., the materials recover their original optical property after the light is turned off The relaxation process can happen automatically or it can be triggered by external conditions such as electrical or magnetic fields, light at different wavelengths, heat, etc.

One preferred embodiment provides a reversible photo-bleachable material comprising semiconductor nanocrystals. Said reversible photo-bleachable material may comprise nanocrystals immersed in a polymer matrix and other chemicals, wherein said reversible photo-bleachable materials may be spun, sprayed, rinsed, dipped, evaporated or deposited by any thin film growth technique onto a surface to form a reversible photo-bleachable layer. The semiconductor nanocrystals may be doped with other elements and/or coated with other semiconductors or chemicals. Upon photon illumination, said reversible photo-bleachable material may become more transparent to the wavelength of said photon, said material may become more transparent to wavelengths other than actinic wavelength, said reversible photo-bleachable material may recover at least part of its original opacity in a certain period of time after the said illumination is turned off, wherein said illumination may comprise photon wavelength from far infrared to deep UV, and said reversible photo-bleachable material may comprise particles with different compositions and structures.

In another aspect, a reversible contrast enhancement layer is provided that is based on the reversible photo-bleachable materials. For example, the method of making a reversible contrast enhancement layer may comprise providing a layer comprising colloidal nanocrystals onto a photoresist layer, and illuminating said layer comprising colloidal nanocrystals to expose at least a portion of said photoresist layer.

In still another aspect, the colloidal nanocrystals described herein are useful for electronics applications such as touch screens, OLED, EL lighting, photovoltaics and LCDs.

Advantageously, the nanocrystals produced in a solvent-less or a substantially solvent-less environment, as described herein, may be tuned to produce a wide variety of shapes and sizes and may be aggregated or non-aggregated. In addition, with the elimination of the passive solvent from the reaction, often, the nanocrystals can be produced more quickly and/or at lower temperatures.

The features and advantages are more fully shown by the illustrative examples discussed below.

Example 1

Figure 2:
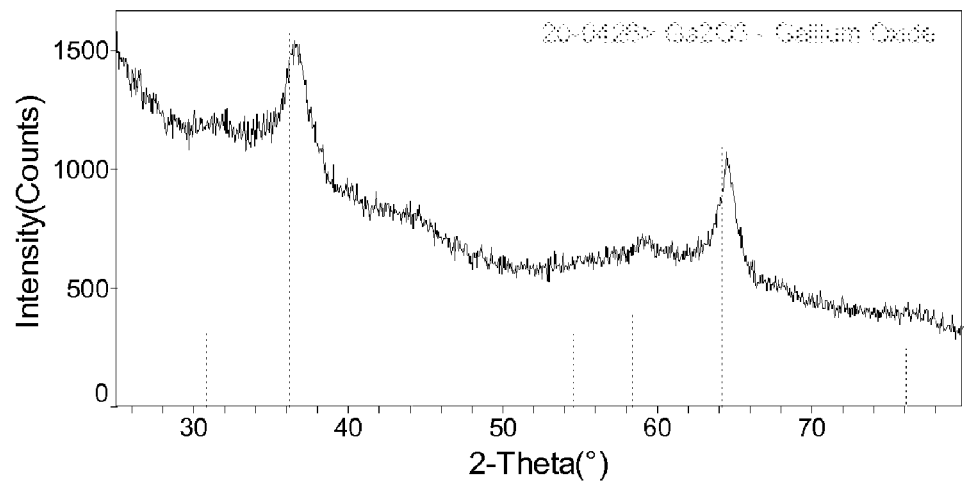
FIG. 2 is an XRD pattern for gallium oxide ($Ga_2O_3$) nanocrystals synthesized using the method described herein.

Gallium oleate (Ga(oleate)$_3$), prepared and purified from the room-temperature reaction of gallium chloride and sodium oleate, was heated under nitrogen to 300° C. and maintained at this temperature for 1 hour. The material was then cooled to room temperature. The solid was extracted with hexane, and the nanocrystals were precipitated with butanol and centrifuged to isolate the precipitate. In this reaction, oleate ligands from the gallium oleate precursor act as the capping groups on the surface of synthesized gallium oxide nanocrystals. The gallium oxide nanocrystals were analyzed using Fourier Transform Infrared (FTIR) spectroscopy, and the spectrum (see FIG. 1) clearly shows vibrational bands at 500, 640 and 690 cm$^{-1}$, which are consistent with the FTIR spectrum of γ-gallium oxide nanocrystals synthesized in oleic acid and octadecene. The X-ray diffraction (XRD) pattern for the γ-gallium oxide nanocrystals is shown in FIG. 2.

Example 2

Figure 3:
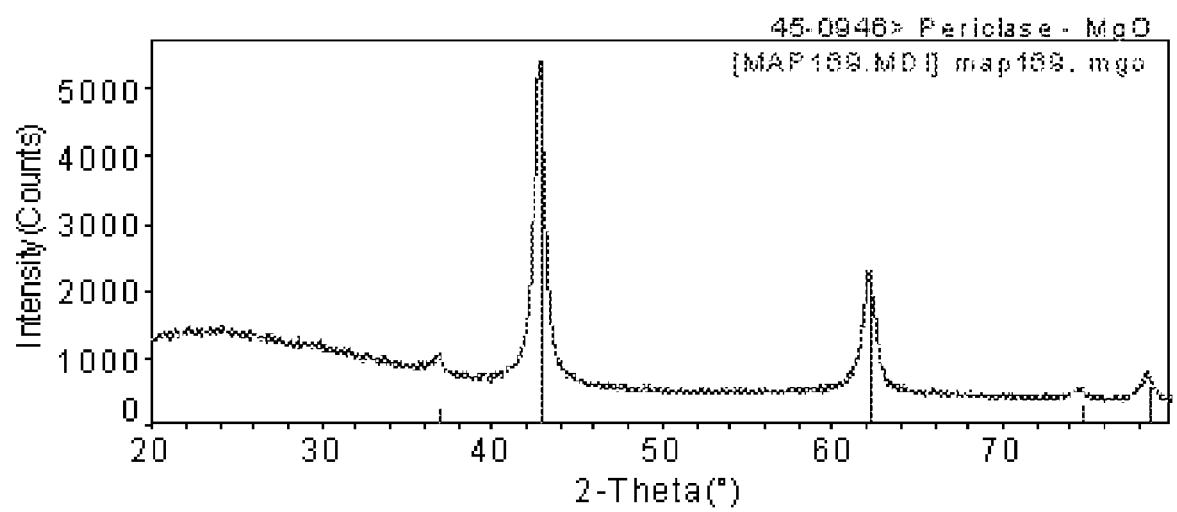
FIG. 3 is an XRD pattern for magnesium oxide (MgO) nanocrystals synthesized using a method described herein.

Magnesium oleate (Mg(oleate)$_2$), prepared and purified from the room-temperature reaction of magnesium chloride and sodium oleate, was heated to 310° C. under a nitrogen atmosphere and maintained at that temperature for two hours. The material was then cooled to room temperature, and the solid was extracted with toluene. The nanocrystals were precipitated with methanol, and the precipitate was collected via centrifugation and dissolved in toluene for analysis. The XRD pattern for the magnesium oxide nanocrystals is shown in FIG. 3, and based on Scherrer analysis of the Bragg reflections, the crystalline particles are approximately 11 nm in diameter.

Example 3

Figure 4:
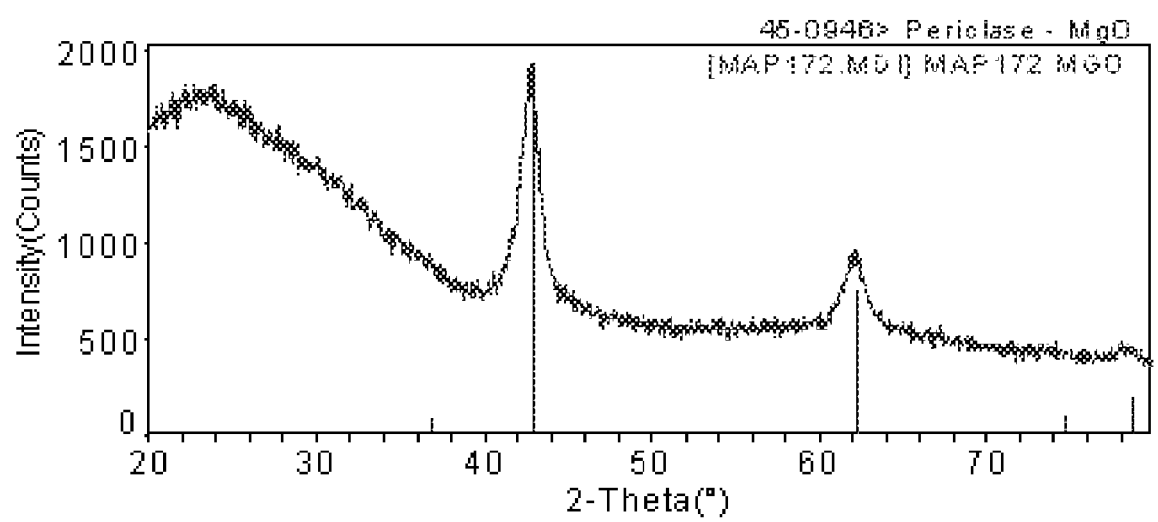
FIG. 4 is an XRD pattern for magnesium oxide (MgO) nanocrystals synthesized using another method described herein.

Magnesium acetate tetrahydrate (0.41 g) and oleic acid (0.64 g) (1:1.2 ratio of Mg to oleic acid) were combined in a flask. The mixture was heated to 165° C. and maintained at that temperature for 90 min under a stream of nitrogen to remove water. The resulting material was a liquid. Next, the liquid material was heated to 310° C. and maintained at that temperature for 90 minutes, after which time it was cooled to room temperature. Hexane was used to extract the material, and the nanocrystals were precipitated with butanol/methanol mixtures two times. The final precipitate was dissolved in hexane for analysis. The XRD pattern for the material is shown in FIG. 4, and based on Scherrer analysis of the Bragg reflections, the particles are approximately 7 nm in diameter.

Example 4

Figure 5:
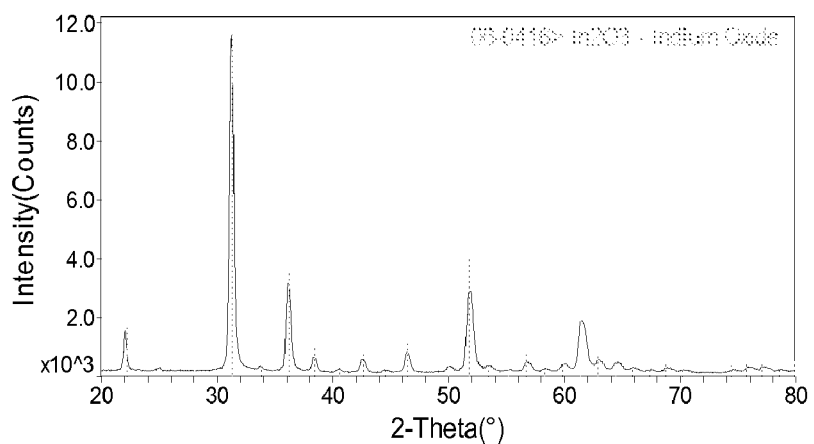
FIG. 5 is an XRD pattern for indium oxide ($In_2O_3$) nanocrystals synthesized using the method described herein.

Indium oleate was heated to 300° C. under a nitrogen atmosphere and maintained at that temperature for 40 min. The material was then cooled to room temperature, and the solid was extracted with hexane. The nanocrystals were precipitated with butanol, and the precipitate was collected via centrifugation and redissolved in hexane. Nanocrystals were then precipitated with methanol, and the collected precipitate was dissolved in hexane for analysis. The XRD pattern for the indium oxide nanocrystals is shown in FIG. 5.

Example 5

Figure 6:
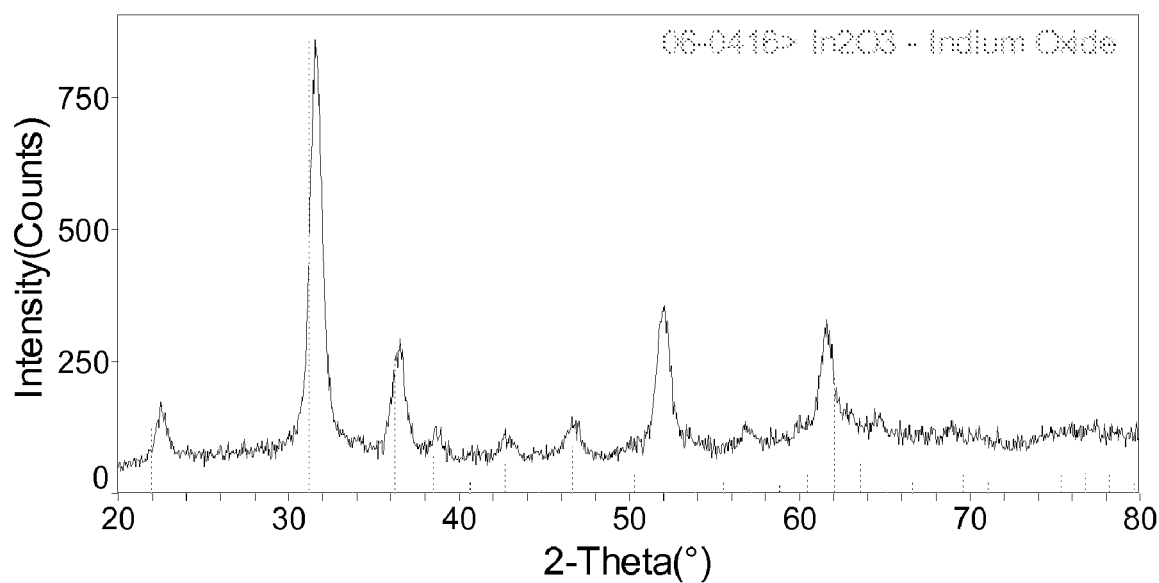
FIG. 6 is an XRD pattern for indium oxide ($In_2O_3$) nanocrystals synthesized using the method described herein.

Indium acetylacetonate (In(acac)$_3$, 1.64 g) and oleic acid (0.887 g) (1:0.75 ratio metal to ligand) were heated to 300° C. under a nitrogen atmosphere and maintained at that temperature for 30 minutes. The material was then cooled to room temperature, and the solid was extracted with hexane. The nanocrystals were precipitated with butanol, and the precipitate was collected, redissolved in hexane, and precipitated with methanol. The precipitate was dissolved in hexane for analysis. The XRD pattern for the indium oxide nanocrystals is shown in FIG. 6. The mass of $In_2O_3$ nanocrystals collected after drying under vacuum to 200 mbar was 0.6322 g. Thermogravimetric analysis (TGA) of the $In_2O_3$ nanocrystals indicates that 73% of the collected material is $In_2O_3$ (without any ligands). Therefore, the yield of $In_2O_3$ without the capping ligands is 83%. For comparison, $In_2O_3$ nanocrystals were synthesized using the traditional methods of the prior art from indium acetylacetonate ($In(acac)_3$, 1.64 g) and oleic acid (0.887 g) in 20 ml octadecene solvent at 300° C. under a nitrogen atmosphere and maintained at that temperature for 30 minutes. The mass of $In_2O_3$ nanocrystals collected after drying under vacuum to 200 mbar was 0.5891 g. TGA of the $In_2O_3$ nanocrystals shows a 50% residual mass, corresponding to an $In_2O_3$ yield of 53%.

Example 6

Figure 7:
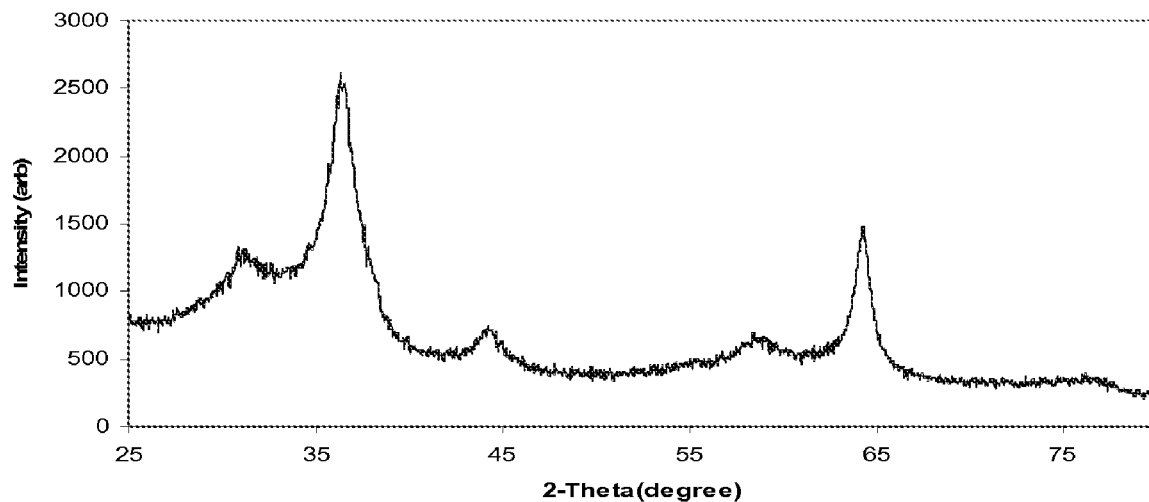
FIG. 7 is an XRD pattern for gallium oxide ($Ga_2O_3$) nanocrystals synthesized using the method described herein.

Gallium acetylacetonate ($Ga(acac)_3$) and lauric acid in a 1:3 molar ratio of metal to ligand were heated to 310° C. under a nitrogen atmosphere and maintained at that temperature for 60 minutes. The XRD pattern for the gallium oxide nanocrystals is shown in FIG. 7.

The product of this reaction is insoluble in nonpolar solvents. This example demonstrates the importance of maintaining the reaction at a temperature at or below the boiling point temperature of the ligand (the boiling point of lauric acid is 299° C. at 760 mmHg).

Example 7

Figure 8:
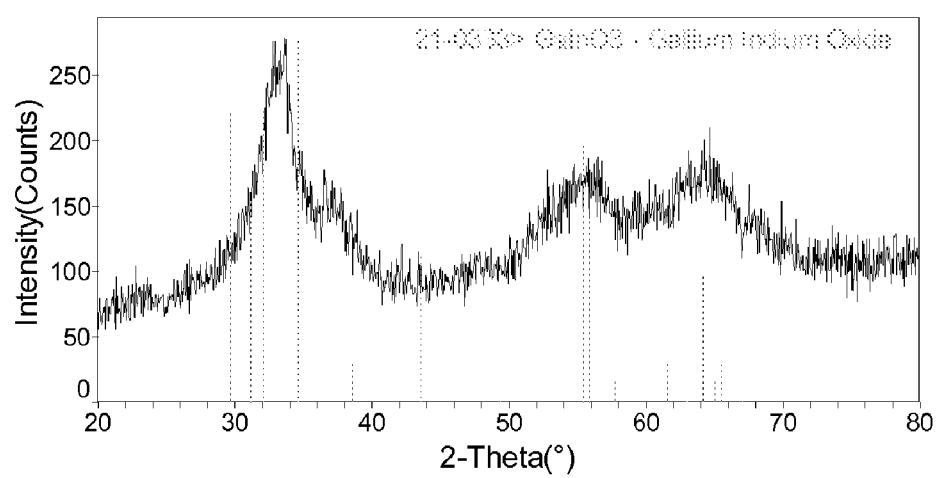
FIG. 8 is an XRD pattern for gallium indium oxide ($GaInO_3$) nanocrystals synthesized using the method described herein.

A mixture of indium acetylacetonate, gallium acetylacetonate (having a $Ga(acac)_3$:$In(acac)_3$ ratio of 1:1) and oleic acid having a combined metal to ligand molar ratio of 1:1.2 was heated to 300° C. under a nitrogen atmosphere and maintained at that temperature for 60 minutes. The material was then cooled to room temperature, and the solid was extracted with hexane. The nanocrystals were precipitated with butanol, and the precipitate was collected, redissolved in hexane, and precipitated with methanol. The final precipitate was dissolved in hexane for analysis. The XRD pattern for the gallium indium oxide nanocrystals is shown in FIG. 8.

Example 8

Figure 9:
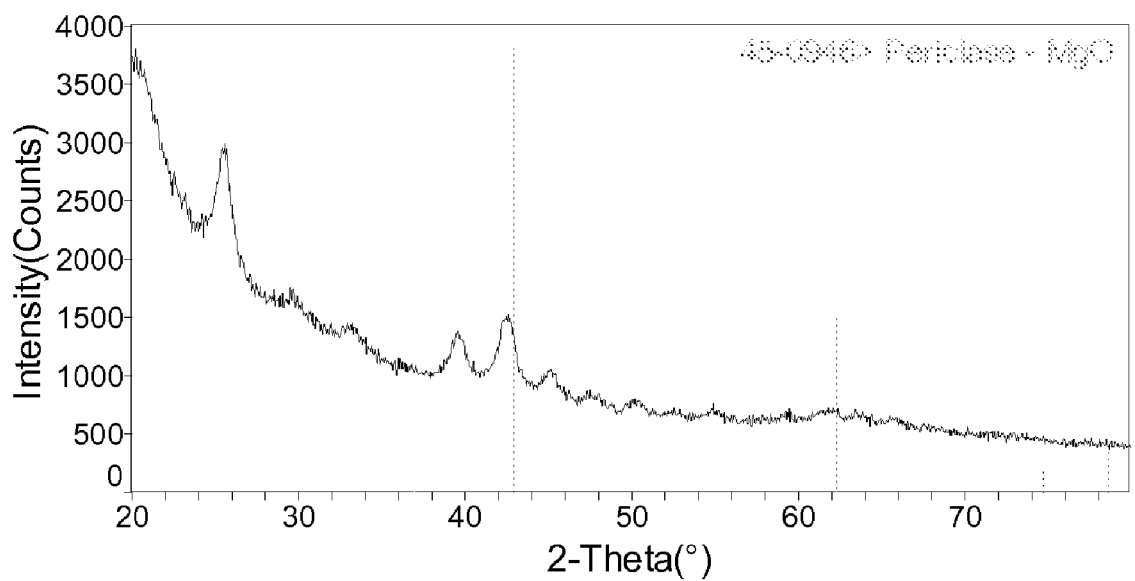
FIG. 9 is an XRD pattern for material collected when the metal-ligand mixture was maintained at a temperature lower than that needed to produce crystalline MgO.

Magnesium acetate tetrahydrate (0.49 g) and oleic acid (1.28 g), 1:2 metal to ligand ratio, were combined in a flask. The mixture was heated to 165° C. and maintained at that temperature for one hour under a flow of nitrogen. Next, the reaction was heated to 300° C. and maintained at that temperature for 75 minutes, after which time the solution was cooled to room temperature. The materials were dissolved in hexane and precipitated with a methanol/butanol mixture. XRD analysis does not reflect the formation of MgO (see, FIG. 9).

Example 9

Figure 10:
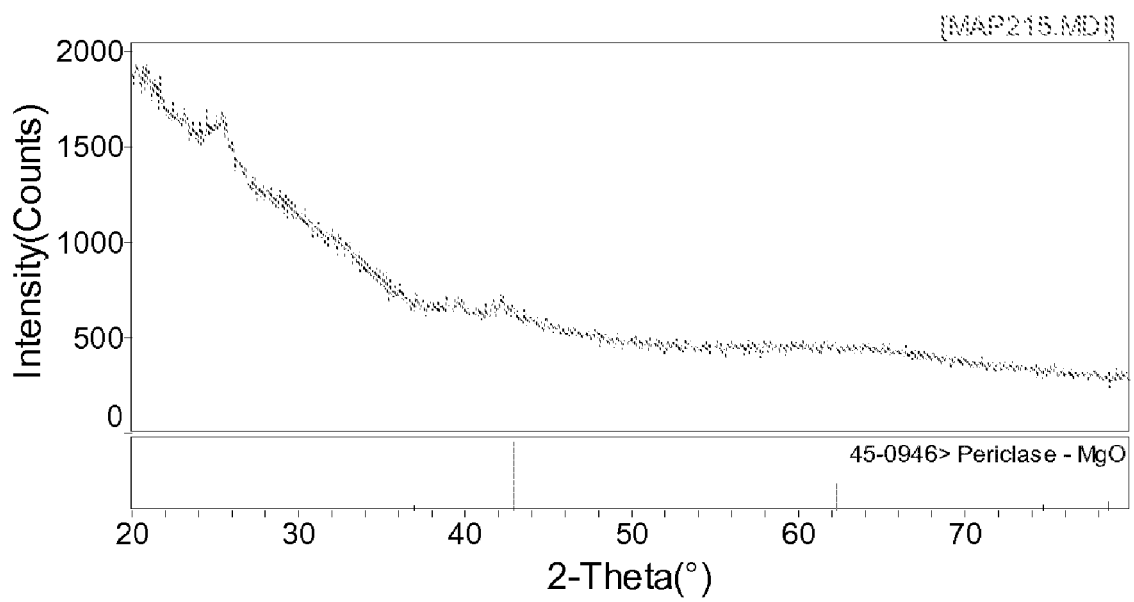
FIG. 10 is an XRD pattern for material collected when the metal-ligand mixture was reacted for a shorter period of time than what is required to produce crystalline MgO.

Magnesium acetate tetrahydrate (0.82 g) and oleic acid (1.28 g), 1:1.2 metal to ligand ratio, were combined in a flask. The mixture was heated to 165° C. and maintained at this temperature for 90 min under a flow of nitrogen. The reaction mixture was next heated to 310° C. and maintained at this temperature for 10 min, after which time it was cooled to room temperature. Toluene was added to afford a solution, and methanol/ethanol mixtures were used to precipitate the formed material. The precipitate was collected via centrifugation, redissolved in toluene, and precipitated with butanol. A white precipitate was collected following centrifugation. FTIR and XRD (see FIG. 10) analyses do not indicate the formation of MgO. Therefore, the length of time the single-source metal-ligand complex and the metal-ligand mixture is maintained at the expected nanocrystal formation temperature (in this case 310° C.) has an impact on whether colloidal nanocrystals are formed.

Example 10

Magnesium oleate ($Mg(oleate)_2$, 1.085 g), prepared and purified from the room-temperature reaction of magnesium chloride and sodium oleate, was heated to 130° C. and evacuated for 10 min to remove any residual solvent or water. The material was next heated to 310° C. under a nitrogen atmosphere and maintained at that temperature for two hours. After cooling to ca. 60° C., 5 mL toluene was added to create a solution. The nanocrystals were precipitated with 5 mL methanol, and the precipitate collected via centrifugation was redissolved in toluene. The nanocrystals were precipitated a second time with methanol. The collected precipitate was dissolved in hexane, and the solution was centrifuged to remove insoluble materials. The solvent was removed in vacuo, affording 122 mg of material. TGA of the nanocrystals affords a residual mass of 46%, indicating that 56.1 mg MgO (without ligands) was collected, corresponding to a 77% yield.

For comparison, MgO nanocrystals were synthesized using the traditional methods of the prior art from magnesium oleate (1.01 g) in 7 mL octadecene. The solution was heated to 130° C., at which time the solution was evacuated for 2 minutes. The solution was next heated to 310° C. under a nitrogen atmosphere and maintained at that temperature for two hours before it was cooled to room temperature. Butanol (15 mL) was used to precipitate the nanocrystals, and the turbid solution was centrifuged. The precipitate was redissolved in toluene, and 5 mL methanol was added to precipitate the nanocrystals. Following centrifugation, the collected precipitate was dissolved in hexane, and the solution was centrifuged to remove insoluble materials. Removal of the solvent in vacuo afforded 70 mg of material. A residual mass of 58.5% was obtained from TGA of the nanocrystals, indicating that 41 mg MgO (without ligands) was collected, corresponding to a 59% yield.

Example 11

Figure 11A:
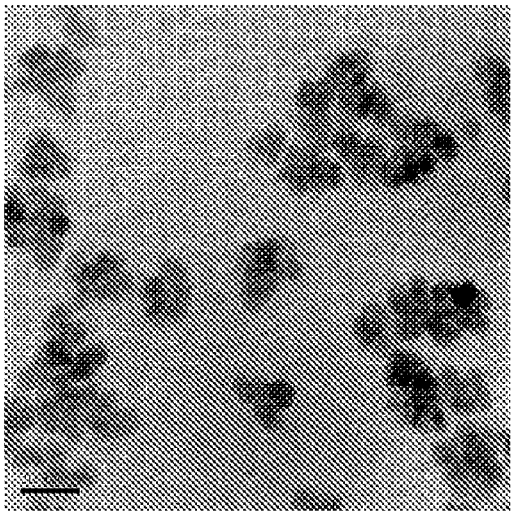
FIG. 11A is a TEM image of indium oxide nanocrystals prepared from a 1:0.75 molar ratio of $In(acac)_3$/oleic acid at 270° C. for 90 min.

Indium acetylacetonate (1.65 g) and oleic acid (0.95 mL), in a 1:0.75 metal-to-ligand ratio, were heated to 270° C. in a nitrogen atmosphere and held at that temperature for 90 minutes. The material was then cooled to room temperature, and the solid was extracted with hexane. The indium oxide nanocrystals were precipitated with butanol, and the precipitate was collected, redissolved in hexane, and precipitated with methanol. The nanocrystals were dissolved in hexane and centrifuged to remove insolubles. The transmission electron microscopy (TEM) image of the nanocrystals in FIG. 11A shows small clusters of nanocrystals with the individual particles having an average diameter of 9 nm. Indium oxide is confirmed with XRD analysis.

Figure 11B:
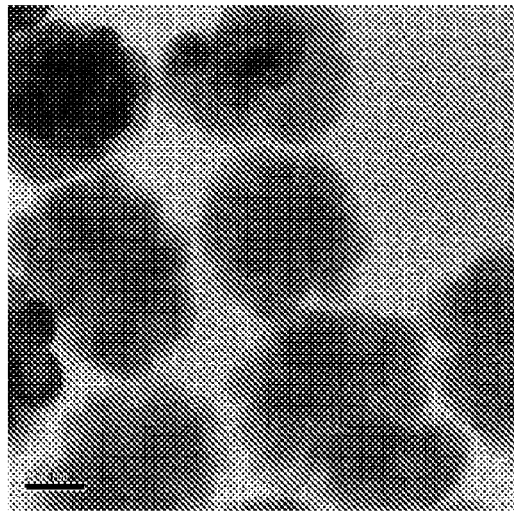
FIG. 11B is a TEM image of indium oxide nanocrystals prepared from a 1:3 molar ratio of $In(acac)_3$/oleic acid at 300° C. for 90 min.

Similarly, indium acetylacetonate (0.55 g) and oleic acid (1.27 mL), in a 1:3 metal-to-ligand ratio, were heated to 300° C. in a nitrogen atmosphere and held at that temperature for 90 minutes. The material was then cooled to room temperature, and the solid was extracted with hexane. The indium oxide nanocrystals were precipitated with butanol, and the precipitate was collected, redissolved in hexane, and precipitated with methanol. The nanocrystals were dissolved in hexane and centrifuged to remove insolubles. The TEM image of the nanocrystals in FIG. 11B shows large clusters of nanocrystals. XRD analysis confirms indium oxide.

The TEM images confirm that by changing the metal-to-ligand ratio, the particle and aggregate size can be tuned. Specifically, as the amount of ligand increases relative to the metal, the size of the particles and aggregates increased.

Example 12

Figure 12A:
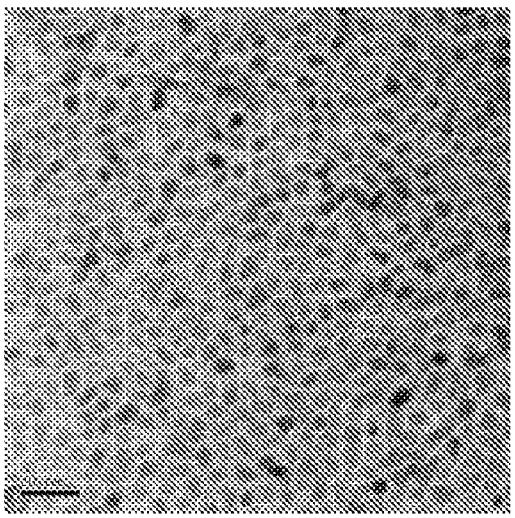
FIG. 12A is a TEM image of indium oxide nanocrystals prepared from a 1:10 molar ratio of $In(My)_3$/octadecanol at 280° C. for 10 min.

Indium myristate (In(My)$_3$, 0.653 g) and octadecanol (2.16 g), in a 1:10 molar ratio, were degassed at 50° C. for 30 min and then heated to 280° C. under nitrogen and held at this temperature for 10 min. The material was cooled, and the reaction mixture was extracted with toluene. The nanocrystals were precipitated two times with ethyl acetate, and the final precipitate was dissolved in toluene and centrifuged to remove insolubles. The TEM image of the nanocrystals in FIG. 12A shows well-dispersed particles. XRD analysis confirms indium oxide.

Figure 12B:
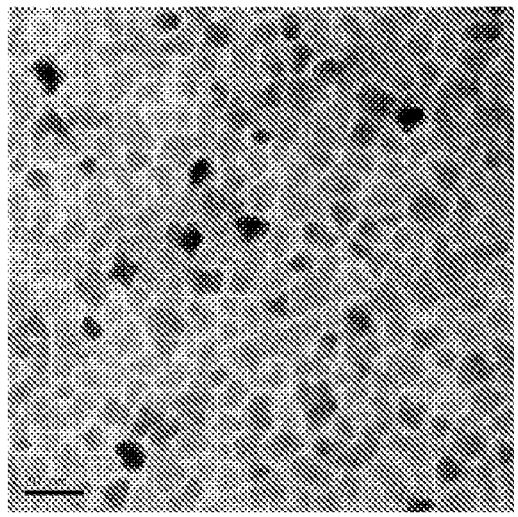
FIG. 12B is a TEM image of indium oxide nanocrystals prepared from a 1:5 molar ratio of $In(My)_3$/octadecanol at 280° C. for 10 min.

Indium myristate (In(My)$_3$, 0.653 g) and octadecanol (1.08 g, 0.004 mol), in a 1:5 molar ratio, were degassed at 70° C. for 20 min and then heated to 280° C. under nitrogen and held at this temperature for 10 min. The material was cooled, and the reaction mixture was extracted with toluene. The nanocrystals were precipitated two times with ethyl acetate, and the final precipitate was dissolved in toluene and centrifuged to remove insolubles. The TEM image of the nanocrystals in FIG. 12B shows non-aggregated particles in a variety of shapes. The particles are larger than the sample shown in FIG. 12A. XRD analysis confirms indium oxide.

The TEM images confirmed that by changing the amount of the activating agent, the particle size can be tuned.

Example 13

Figure 13:
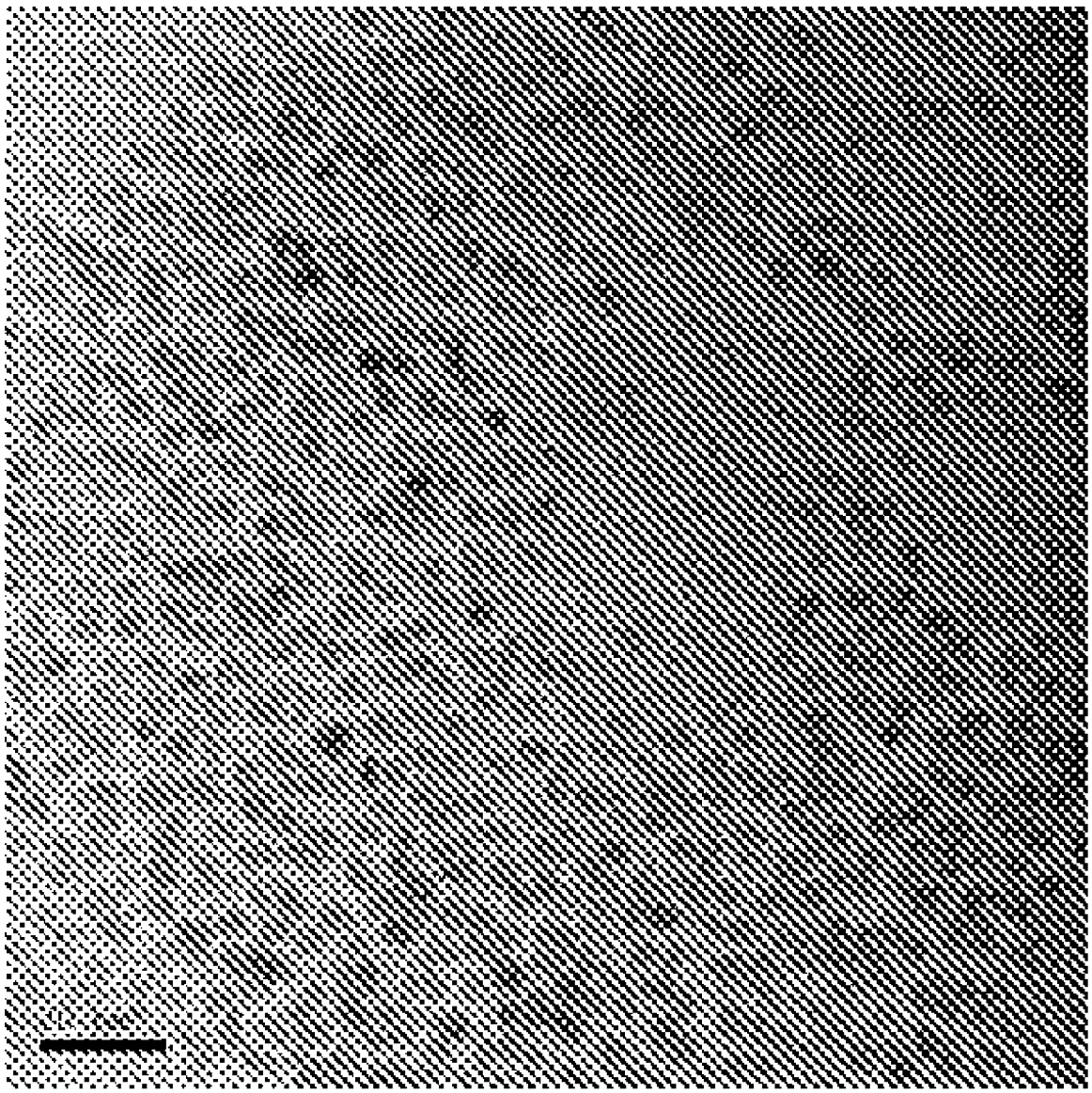
FIG. 13 is a TEM image of indium oxide nanocrystals prepared from the reaction of $In(My)_3$ and 1,2-dodecanediol in a 1:5 molar ratio at 280° C. for 10 min.

Indium myristate (In(My)$_3$, 0.653 g) and 1,2-dodecanediol (0.816 g), in a 1:5 molar ratio, were degassed at 70° C. for 60 min and then heated to 280° C. under nitrogen and held at this temperature for 10 min. The resulting solution was cooled, and the reaction mixture was extracted with toluene. The nanocrystals were precipitated two times with ethyl acetate, and the final precipitate was dissolved in hexane and centrifuged to remove insolubles. The TEM image of the nanocrystals in FIG. 13 shows indium oxide nanocrystals with improved dispersity and a particle size smaller than the results shown in FIG. 12, indicating size tunability by changing the activating agent. XRD analysis confirms indium oxide.

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art, based on the disclosure herein. The invention therefore is to be broadly construed, as encompassing all such variations, modifications and alternative embodiments within the spirit and scope of the claims hereafter set forth.

What is claimed is:

1. A method of synthesizing soluble colloidal nanocrystals, said method comprising heating a reaction mixture comprising at least one single source metal-ligand complex, a metal-ligand mixture, or combinations thereof, in a substantially solvent-free environment at temperature and time effective to thermally decompose the reaction mixture into material comprising colloidal nanocrystals.

2. The method of claim 1, wherein the reaction mixture comprises a metal-ligand mixture and at least one single source metal-ligand complex.

3. The method of claim 2, wherein the metal-ligand mixture is produced by reacting at least one metal salt and at least one long chain surfactant in a solvent-free environment at temperature and time effective to produce the metal-ligand mixture.

4. The method of claim 3, wherein the at least one metal salt comprises an anionic group selected from the group consisting of formate, acetate, acetylacetonate, oxide, alkoxide, fluoride, chloride, bromide, iodide, carbonate, hydroxide, oxalate, sulfate, sulfite, phosphate, and nitrate.

5. The method of claim 3, wherein temperature is in a range from about 30° C. to about 200° C. and time is in a range from about 10 min to about 120 min.

6. The method of claim 1, wherein the heating is carried out in the presence of a gas, wherein the gas comprises a species selected from the group consisting of $N_2$, Ne, Ar, Kr, Xe, air, $N_2O$, $O_2$, and combinations thereof.

7. The method of claim 1, wherein temperature is in a range from about 30° C. to about 350° C.

8. The method of claim 1, wherein the reaction mixture comprises at least one metal selected from the group consisting of Li, Na, K, Rb, Cs, Mg, Ca, Sr, Ba, Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Ce, Pr, Nd, Dy, Th, Eu, Gd, Er, La, B, Al, Ga, In, Ge, Sn, Sb, Bi, Pb, and combinations thereof.

9. The method of claim 1, wherein the reaction mixture comprises at least one surfactant having at least one head group selected from the group consisting of sulfate, sulfonate, sulfinate, phosphate, phosphite, phosphine, phosphine oxide, phosphinate, phosphonate, carboxylate, alcohol, thiol, amine, and combinations thereof.

10. The method of claim 1, wherein the reaction mixture comprises at least one surfactant selected from the group consisting of oleic acid, stearic acid, linoleic acid, myristic acid, lauric acid, 2-ethylhexanoic acid, azelaic acid, palmitic acid, linolenic acid, erucic acid, stearyl amine, oleyl amine, erucic amine, lauryl amine, decanol, cetyl alcohol, oleyl alcohol, stearyl alcohol, lauryl alcohol, decanethiol, dodecanethiol, tetradecanethiol, hexadecanethiol, trioctylphosphine, tris(2-ethylhexylphosphine, triphenylphosphine, tri-p-tolylphosphine, tri-m-tolylphosphine, tri-o-tolylphosphine, methyldiphenylphosphine, ethyldiphenylphosphine, cyclohexyldiphenylphosphine, benzyldiphenylphosphine, trioctyl phosphine oxide, tris(2-ethylhexyl)phosphine oxide, triheptyl phosphine oxide, tripentyl phosphine oxide, tridecyl phosphine oxide, tris(2-ethylhexyl)phosphite, trioleyl phosphite, trilauryl phosphite, tristeryl phosphite, di isodecyl pentaerythytol diphosphite, trioctyl phosphite, triphenyl phosphite, tricyclodecane dimethanol phosphite, tris(2-ethylhexyl)phosphate, trioleyl phosphate, tristearyl phosphate, trilauryl phosphate, tributyl phosphate, trioctyl phosphate, octadecylphosphonic acid, tetradecylphosphonic acid, pentadecylphosphonic acid, dodecylphosphonic acid, decylphosphonic acid, decyl methyl sulfoxide, dimethyl sulfoxide, dioleyl sulfoxide, dilauryl sulfoxide, distearyl sulfoxide, tosyloxyphenyl sulfone, tosyloxyvinyl sulfone, and combinations thereof.

11. The method of claim 1, wherein the colloidal nanocrystal comprises a metal oxide or a mixed metal oxide.

12. The method of claim 1, wherein the colloidal nanocrystal is stabilized by at least a partial layer of ligands attached to the metal oxide.

13. The method of claim 1, wherein the colloidal nanocrystals are substantially crystalline.

14. The method of claim 1, further comprising at least one additional process selected from the group consisting of:
   (i) cooling the colloidal nanocrystals for isolation and purification;
   (ii) extracting the colloidal nanocrystals from the material with at least one nonpolar organic solvent to form an extraction mixture and precipitating the colloidal nanocrystals by combining the extraction mixture with at least one polar solvent;
   (iii) selectively dissolving the colloidal nanocrystals without substantially dissolving the by-products; and
   (iv) selectively dissolving the by-products without substantially dissolving the colloidal nanocrystals.

15. The method of claim 1, wherein the method of heating the reaction mixture is performed in the substantial absence of sodium salts, polysorbate 80, reducing agents, hydroxide bases, hydrocarbon solvents, and combinations thereof.

16. The method of claim 1, wherein the reaction mixture comprises at least one single source metal-ligand complex or a metal-ligand mixture.

17. The method of claim 1, wherein the reaction mixture further comprises at least one activating agent selected from the group consisting of: alcohols; diols; amines; carboxylic acids; acid chlorides; carboxylate salts; anhydrides; and molecules, oligomers and polymers containing multiple numbers of these reactive sites; and combinations thereof.

18. The method of claim 1, wherein the environment is solvent-free.

19. Magnesium oxide nanocrystals comprising substantially crystalline MgO, wherein the nanocrystals are soluble in a nonpolar solvent.

20. Gallium indium oxide nanocrystals comprising substantially crystalline $Ga_xIn_{2-x}O_3$, wherein x=0-2, and wherein the nanocrystals are soluble in a nonpolar solvent.

* * * * *